W. FINDLEY.
ROAD DRAG.
APPLICATION FILED JAN. 28, 1916.
1,215,011.
Patented Feb. 6, 1917.
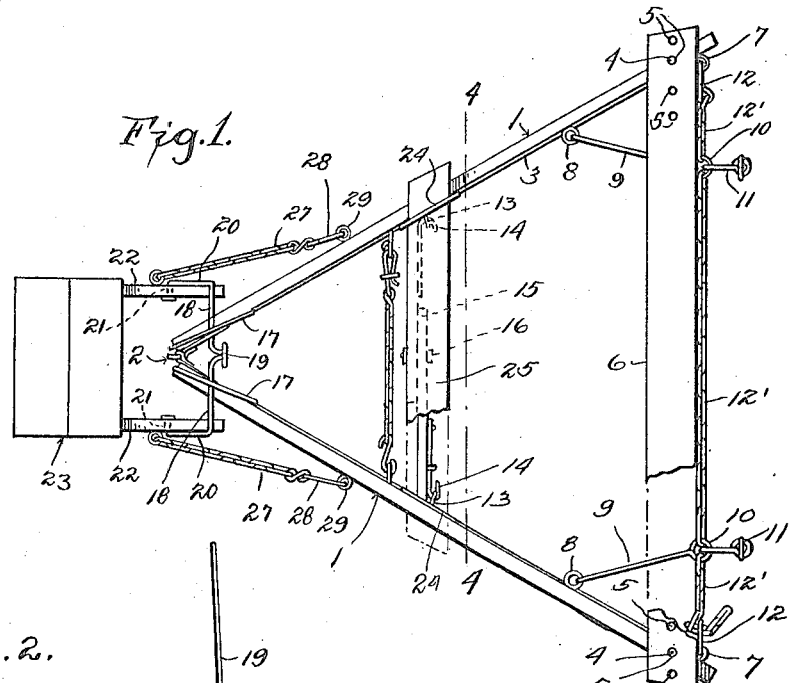
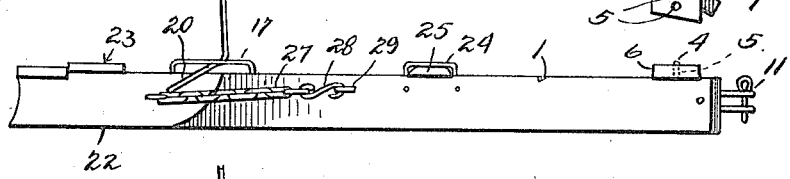
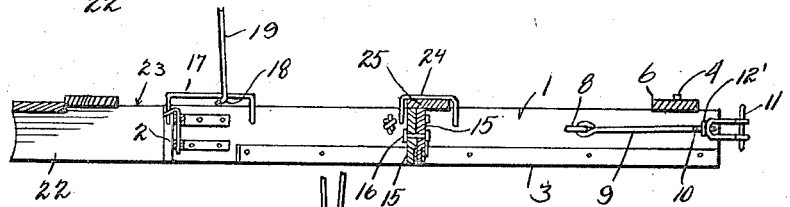
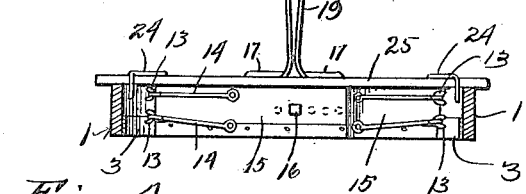
Witnesses
Inventor
W. Findley
By
Attorneys

UNITED STATES PATENT OFFICE.

WILLIAM FINDLEY, OF EMMETT, IDAHO.

ROAD-DRAG.

1,215,011.

Specification of Letters Patent.

Patented Feb. 6, 1917.

Application filed January 28, 1916. Serial No. 74,845.

*To all whom it may concern:*

Be it known that I, WILLIAM FINDLEY, a citizen of the United States, residing at Emmett, in the county of Gem, State of Idaho, have invented certain new and useful Improvements in Road-Drags; and I do hereby declare the following to be a full, clear, and exact description of the invention, such as will enable others skilled in the art to which it appertains to make and use the same.

The present invention is directed to improvements in road drags, and has for its object to provide a device of this character which is so constructed that the same can be easily adjusted for use in connection with narrow or wide roadways.

A further object of the invention is to provide a drag of this nature having novel means whereby the rear end of the same can be elevated to free the earth scraped from the roadway.

With these and other objects in view, this invention resides in the novel features of construction, formation, combination and arrangement of parts to be hereinafter more fully described, claimed and illustrated in the accompanying drawing, in which:—

Figure 1 is a top plan view of the device.

Fig. 2 is a side elevation.

Fig. 3 is a longitudinal sectional view through the same.

Fig. 4 is a sectional view on line 4—4 of Fig. 1.

The device comprises a pair of drag bars 1, the rear ends of which are pivotally connected, as at 2, said bars being provided upon their inner surfaces with metal strips 3 which will prevent wear of the bars.

Mounted upon the upper edges of the bars 1 and adjacent the forward ends thereof are pins 4 which are adapted to selectively engage the openings 5 formed in the bar 6 whereby the bars 1 can be adjusted and held in the desired position.

The drag bars are further provided with eye-bolts 7 and 8, the eye-bolt 8 having connected thereto the rear ends of the links 9, the forward ends of said links being provided with rings 10 which are engaged by the clevises 11, said clevises serving to attach the draft animals to the device. The rings 10 are connected to the clips 12, said clips being connected to the bolts 7.

By providing the clips 12 the chains 12' may be adjusted when the bars 1 are adjusted.

The inner surfaces of the bars 1 are provided with eyes 13 which are detachably engaged by the hooks 14, said hooks being fixed to the front faces of the drag boards 15, which are adapted to extend transversely of the device and have their adjacent ends arranged in overlapping relation and connected by a bolt 16.

Fixed to the rear ends of the bars 1 are loops 17 which are slidably engaged by the arms 18 of the lever 19, said arms terminating in arms 20 which have their rear ends formed with extensions 21, said extensions being pivotally connected to the runners 22 of the sled 23.

The bars 1 are provided with loops 24 which engage the ends of the bar 25, said loops being so arranged that the bar 25 will be disposed directly over the upper edges of the drag boards 15, whereby the same will be prevented from moving upwardly when the device is in operation.

By providing the lever 19, it is obvious that when the same is grasped by the operator who stands upon the sled, and pulls rearwardly the arms 18 will slide in the loops 17, thereby raising the rear end of the bars 1 so that the scraped earth may pass under the drag boards 15 and under the rear end of the bars 1.

The runners 22 of the sled are connected to the bars 1 by the chains 27, which have their forward ends provided with hooks 28 adapted to detachably engage the eye-bolts 29 carried by the drag bars.

What is claimed is:—

A device of the class described comprising a pair of drag bars having their rear ends hingedly connected, means for holding the drag bars in adjusted diverging positions, drag boards connected to the inner sides of the drag bars, said drag boards having their adjacent ends overlapping and adjustably connected, loops carried by the drag bars, a bar having its ends engaged in the loops and engaged with the upper edges of the drag boards, second loops carried by the rear ends of the drag bars, a sled, a lever having arms pivotally connected to the runners of the sled and slidable in the second named loops, as and for the purpose set forth.

In testimony whereof, I affix my signature, in the presence of two witnesses.

WILLIAM FINDLEY.

Witnesses:
W. T. CROUCH,
S. H. REED.